E. W. FLAGG.
Tube-Expander.
No. 166,925.  Patented Aug. 24, 1875.
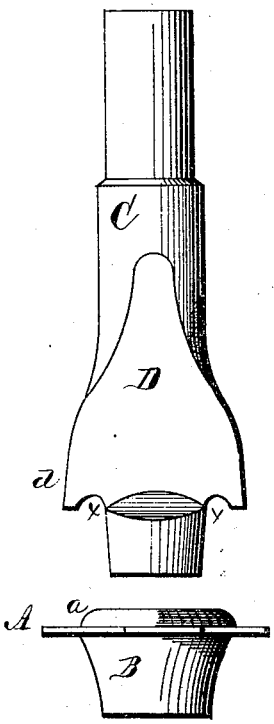
WITNESSES
Franck L. Ourand
C. L. Everts
INVENTOR
E. W. Flagg
Alexander Mason
Attorney

UNITED STATES PATENT OFFICE.

ELI W. FLAGG, OF BATTLE CREEK, MICHIGAN, ASSIGNOR TO HIMSELF AND GEORGE D. EDMONDS, OF SAME PLACE.

IMPROVEMENT IN TUBE-EXPANDERS.

Specification forming part of Letters Patent No. 166,925, dated August 24, 1875; application filed April 6, 1875.

*To all whom it may concern:*

Be it known that I, ELI W. FLAGG, of the city of Battle Creek, in the county of Calhoun and in the State of Michigan, have invented certain new and useful Improvements in Tube-Expanders; and do hereby declare that the following is a full, clear, and exact description thereof, reference being had to the accompanying drawings and to the letters of reference marked thereon, making a part of this specification.

My invention is designed to accomplish by a rotary burnishing action the fastening of the end of a tube in a plate or sheet; and it consists of a tool composed of a spindle adapted to revolve within the tube, and provided with curved projections or wings to form a bead on the end of the tube, as will be hereinafter more fully set forth.

In order to enable others skilled in the art to which my invention appertains to make and use the same I will now proceed to describe its construction and operation, referring to the annexed drawing, in which—

Figure 1 is a side view of my improved swaging-tool. Fig. 2 is an edge view of the same, showing also in section the work done by the same.

A represents a plate or sheet with a tube, B, properly beaded and fastened in the same. C is a spindle having one end constructed of a size to snugly fit the tube to be beaded, which spindle is to be rotated by hand or in a lathe, or by other suitable means. A part of the spindle C is flattened, as shown at D, forming two projecting wings or lips, $a\ a$, in the underside of which are made semicircular notches $x\ x$, as shown.

In the operation of this tool the spindle C (or the work) is rotated—pressure being applied as the work progresses—so as to turn the end of the tube and form the bead $d$, and and polish the bead at the same time.

I am aware that a swaging-tool is in use which is provided with rollers to run down the edge.

This swaging and polishing tool may be used for fastening hoe-handles, boiler-tubes, or any other tubular articles.

Having thus fully described my invention, what I claim as new, and desire to secure by Letters Patent, is—

The within-described tube-expander, consisting of the spindle C, with flattened part D, having projecting lips $d$ with curved notches $x$ therein, all formed of one piece of metal, substantially as and for the purposes herein set forth.

In testimony that I claim the foregoing I have hereunto set my hand this 3d day of March, 1875.

ELI W. FLAGG.

Witnesses:
H. P. CHADEEYNE,
D. H. METCALF.